United States Patent Office 3,732,076
Patented May 8, 1973

3,732,076
RARE EARTH HYDROGEN DETECTOR
Stephen M. Toy, Orange, and Austin Phillips, Santa Monica, Calif., assignors to McDonnell Douglas Corporation
Filed June 21, 1971, Ser. No. 155,019
Int. Cl. G01n 21/12, 21/60
U.S. Cl. 23—232 R                        10 Claims

ABSTRACT OF THE DISCLOSURE

Hydrogen emanation and distribution at microstructural features to one micron size and below and bulk hydrogen to .001 part per million is detected with a rare earth metal detector system. The system operates on the basis of a chemical reaction of a rare earth metal with hydrogen. The rare earth metal is applied to the surface of the specimen to be examined and allowed to react with the hydrogen therein to form a metal hydride. In most rare earth metals, a color change occurs at the hydride reaction sites so that hydrogen emanation areas can be located on the specimen. By measuring the volume of the hydride sites, the amount of hydrogen reacted with the rare earth, and hence the amount of hydrogen in the specimen can be calculated.

BACKGROUND OF THE INVENTION

When atomic hydrogen enters steel and certain other metals and alloys, it can cause any of several undesirable reactions. If large quantities of hydrogen are introduced, there may be a general loss in ductility or if the hydrogen accumulates in certain localized areas, internal bursts or blisters may be produced. At times, hydrogen in a high-strength alloy may react with the alloy to produce catastrophic brittle failures when stresses far below the yield strength or the nominal design stress for the alloy are applied. All of these phenomena mentioned above are collectively referred to as hydrogen embrittlement. Of these the most troublesome is the hydrogen induced, catastrophic brittle failure of high strength alloys at relatively low stresses since this phenomenon frequently occurs at ambient temperatures in materials that exhibit no appreciable loss in ductility as measured by a conventional tensile test, and therefore the failure is difficult if not impossible to anticipate. Among those materials especially troublesome to this brittleness or, as it is sometimes called, hydrogen-stress cracking, are ferritic and martensitic steels and certain titanium alloys.

It is generally agreed that the hydrogen-stress cracking of steel is influenced by several factors. As the strength level of the steel is increased above some minimum value, as the applied stress is increased above some minimum (but much lower) value and as the hydrogen content is increased, the time required for hydrogen-stress cracking to occur decreases. Also there are indications that under given hydrogen charging conditions, the maximum stress that the steel can support without failure decreases as the strength level of the steel is increased. In addition, it is generally agreed that hydrogen must be free to move through the steel before hydrogen-stress cracking will occur. This phenomenon is temperature dependent and unfortunately appears to be most severe in the general vicinity of ambient temperature since at cryogenic temperatures, the diffusion rate of hydrogen is small and at elevated temperatures the diffusion rate of hydrogen is so high that the material loses the damaging hydrogen before the hydrogen-stress cracking mechanism can become operative. Hydrogen-stress cracking of steel is also strain dependent but not in the same way that most other forms of embrittlement are. Ordinarily hydrogen has no effect on the behavior of steel during an impact test and some hydrogen charged specimens exhibit normal ductility in a conventional tensile test. However, at very low strain rates or under a static load, the specimens may show very severe embrittlement.

Titanium alloys have been shown to exhibit at least two types of hydrogen embrittlement and these have been designated as impact embrittlement and low strain rate embrittlement. The type of hydrogen embrittlement that is most often encountered in high strength alpha-beta titanium alloys is the low strain rate type. The sensitivity of titanium alloys to hydrogen embrittlement at low strain rate appears to increase with increasing tensile strength, notch severity, alpha grain size, continuity of beta phase and hydrogen content. Thus, in some respects the hydrogen embrittlement of alpha-beta titanium alloys resembles that of high strength steels.

As should be obvious from the above, it would be expected that any condition that alters the strength, the applied stress or the hydrogen content of a given material could influence its sensitivity to hydrogen embrittlement. The general trend toward high tensile strengths, higher design stresses and the use of materials and applications requiring prolonged exposure to sustained loads assures that at least two of the conditions necessary for the occurrence of hydrogen-stress cracking will be present in certain types of aerospace and aircraft applications. All that remains is for an adequate supply of hydrogen to be available and for this hydrogen to be free to diffuse through the material. If the material is sensitive to hydrogen-stress cracking, delayed failures can be expected to occur, thus for high strength materials sensitive to hydrogen-stress cracking, the most important factors tending to promote hydrogen-stress cracking are the hydrogen content of the material and the propensity of the material to absorb hydrogen from its environment, either during processing or in service.

The source of the hydrogen in the metal is of little importance. It can be introduced during melting or heat-treating operations; during cleaning, pickling, or electroplating processes; or it may be picked up from the service environment as a result of cathodic protection reactions or corrosion reactions. Heretofore there has been no satisfactory nondestructive method by which to judge whether a specimen known to be sensitive to hydrogen-stress cracking has absorbed enough hydrogen to make its ability to meet its design requirements suspect.

Therefore, empirical methods of applying hydrogen bake-out treatments to high strength specimens have been used. In all cases, there has never been a nondestructive way to assure that the bake-out process was long enough or that it in fact was really required at the time it was performed since heretofore there has been no method to nondestructively measure the actual hydrogen content of a specimen and no method, destructive or not, has been available which can measure the concentration and location of the very small quantities of hydrogen which can cause hydrogen embrittlement in the most sensitive materials.

The prior art techniques for measuring hydrogen emanation and distribution in metals and alloys have well-known deficiencies. Although vacuum fusion, hot extraction, hydrogen pressure gauges and mass spectrometry methods, can measure hydrogen emanated down to low concentration levels, these methods do not distinguish between hydrogen emission from the bulk metal phase, grain boundaries or from secondary phases. Also, they do not indicate how the hydrogen is distributed in the microstructural features of the metal or alloy.

Autoradiography methods using radiosotopes of hydrogen such as tritium induced into the metal during processing have been used when it has been desired to locate hydrogen and its distribution in a specimen. Unfortunately, the isotopes of hydrogen are all atomically much larger than ordinary hydrogen and therefore the assumption that they act like hydrogen may be erroneous.

Autoradiograph can be contact radiography which consists of merely placing dry X-ray film over a hydrogen isotope containing sample. Contact radiography can enenable a resolution of the isotope of approximately 50 times. Stripping film autoradiography on the other hand, makes use of fine grain, beta ray-sensitive emulsions. Optical microscopic analysis of the emulsion is used with strip film autoradiography to allow relatively high resolution of the isotope sites. Even better resolution can be obtained by using wet process autoradiography. In wet process autoradiography, a sensitized silver halide layer is formed on the specimen and a resolution of sites of approximately 10 microns can be obtained. The highest resolution method of the prior art systems uses an electron microscope to reveal both the structure of the specimen and the location of the radioactive hydrogen isotope. A fine silver halide emulsion over a carbon replica is used and resolution of sites down to 0.1 micron is possible.

These hydrogen radiosotope methods have the disadvantage of high cost, loss of resolution by attenuation of the radiation by heavy elements in the alloy, and they also require special handling facilities. Therefore, a new approach to detecting hydrogen emanation and its distribution at microstructural features in metals and alloys has been required, especially as the evidence has pointed more and more to the problem of hydrogen embrittlement of high strength metals and alloys. For hydrogen embrittlement studies there has been a need to identify the microstructural features associated with hydrogen in a relatively simple manner and to provide a better understanding about the behavior of hydrogen and such materials.

BRIEF DESCRIPTION OF THE INVENTION

The present invention detects and pinpoints the sites of hydrogen occlusions in ferrous and non-ferrous metal alloys. Hydrogen is the most difficult element to detect and to quantitatively analyze which heretofore has made an appraisal of its true deleterious impact almost impossible. This, of course, is due to hydrogen's small atomic weight and the fact that only an infinitesimal amount of hydrogen is required to grossly affect the properties of metal alloys.

The present invention can be used to study the position and amount of hydrogen present in metals and is not only nondestructive in nature but is also curative in certain circumstances. The invention comprises placing a relatively thin film of rare earth metal such as nodymium on a specimen. The invention comprises placheated to hasten the reaction between the hydrogen in the structure and the rare earth metal. Hydrogen in the structure is emitted and it reacts with the rare earth metal to form a metal hydride compound which is usually visible as a round discolored particle. The particle is in juxtaposition in the rare earth film to the microstructure from which it was emitted. Using the present invention, resolution of hydrogen sites smaller than 1 micron and less than .01 part per million of $H_2$ in steel is possible and resolutions down to .001 part per million are possible when an electron microscope is used to observe the reaction sites.

It is especially important that no radioisotope hydrogen is required in the present invention so that no special processing or handling of the specimen material is required. This means that hydrogen can be detected in any specimen such as a failed part so that the effect of hydrogen can be detected. The present invention can detect hydrogen with much higher resolution than in the other methods and with considerably less cost. There is also no isotope limitation due to attenuation of X-ray signals by heavy elements in the specimen, which in some test methods act as their own shields to give false results. Furthermore, certain rare earth metals such as beta neodymium are optically transparent and therefore, the in-situ neodymium di-hydride ($NdH_2$) reaction sites can be directly related optically to the microstructure on which they are formed.

It is therefore an object of the present invention to provide a hydrogen detection system capable of producing higher resolutions than the heretofore known hydrogen detection systems.

Another object of the invention is to nondestructively test fabricated specimens for hydrogen levels as low as thousandths of parts per million.

Another object is to provide a hydrogen detection method which can be performed with readily available equipment at reasonable cost.

Another object is to provide a hydrogen detection method which requires no special forming of specimens such as by inserting isotopes therein.

Another object of the present invention is to provide a hydrogen detection system which requires no radioactive materials.

Another object is to provide a hydrogen detection method which can be used to prevent hydrogen embrittlement of high strength metals as well as detecting hydrogen embrittlement thereof.

These and other objects and advantages of the present invention will become apparent after considering the following detailed specification which covers preferred embodiments thereof in conjunction with the accompanying drawings wherein:

DETAILED DESCRIPTION OF THE PRESENT EMBODIMENTS

Figure 1:
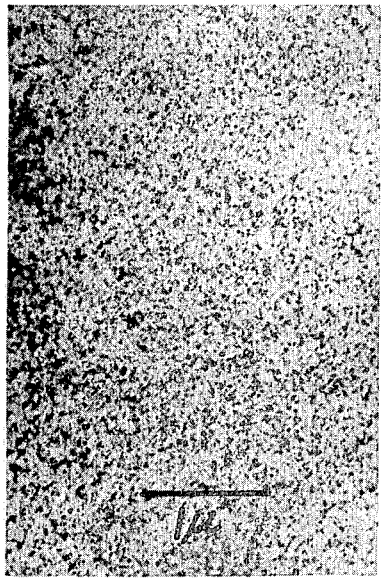
FIG. 1 is an electron transmission micrograph of an evaporated bcc beta neodymium film.

The present method to detect hydrogen content and to pinpoint the sites of hydrogen occlusions in ferrous and nonferrous alloys includes placing a relatively thin film of a rare earth metal upon the specimen whose hydrogen content is to be investigated. The rare earth metal may be placed on the specimen by evaporation as is described herein or it may be deposited on a metal foil. Once the rare earth metal is applied to the specimen, the specimen may be left at room temperature or heated depending upon the rare earth metal and its tendency to form a hydride since most rare earth metals react with hydrogen slowly at room temperature and more rapidly at increased temperatures in the range of 300° F. Table 1 shows the sensitivity to hydrogen gas and the reaction temperatures of a selected number of rare earth elements since these elements seem, due to their high sensitivity, to be the most promising. Also, although in the following examples, neodymium is used due to its high sensitivity at ambient and slightly above ambient temperatures, any of the rare earths may be used and in fact, sometimes it may be desirable to use a solid solution alloy thereof. For example, a combination of neodymium and praseodymium has been demonstrated to react similarly to neodymium although with less sensitivity. The metal hydride formed, however, is more stable than neodymium dihydride alone when exposed to the atmosphere and therefore, such alloys may be usedful where facilities are not available adjacent to test sites to read the results of the experiment.

TABLE 1

| Element | Density, gm./cc. | Atomic weight, gm./mole | Normalized[1] sensitivity ($S_n$) | Reaction temp., °C. |
|---|---|---|---|---|
| Nd | 6.84 | 144.27 | 1.00 | 29 |
| Pr | 6.64 | 140.92 | .990 | ~300 |
| Ce | 6.67 | 140.13 | .996 | 20–100 |
| Y | 4.25 | 88.92 | 1.17 | ~300 |

[1] Based on a one square centimeter area by 1,400 A. thick detector film. Therefore $$V = 1.4 \times 10^{-5} \text{ cm.}^3 \text{ and } S = \frac{\rho \times V}{\text{atomic wt.}}, \text{ so, } S_n = \frac{S_x}{S_{Nd}}$$

Although all the rare earth metals are capable of forming hydrides at room temperature, only a few have reported to be reliable near room temperature and they include neodymium and cerium. However, most of the rare earth metals react reliably at higher temperatures which are not in excess of those temperatures which can be conveniently obtained through the use of hot air guns and the like.

Any hydrogen gas in the structure under test emits or diffuses and reacts with the rare earth forming a metal hydride compound. In the case of neodymium the hydride compound is optically visible as a round dark particle. The hydride compound is found in juxtaposition in the rare earth film to the microstructure from which the hydrogen was emitted and therefore not only can the amount of hydrogen in the sample be calculated through a calculation of the amount of rare earth hydride resulting but the position from which the gas is emitted can also be observed.

Although neodymium seems to be the best choice for utilization in the present method because of its optical clarity, hydrogen sensitivity and color change, the use of a scanning electron microscope (SEM) to observe the films after reaction allows identification of the metal hydride reaction sites without a color change. This is because an SEM identifies the reaction sites by an electron charge buildup on the non-conducting hydride compound. One therefore does not have to rely on a color change. At the same time, oxide contamination obscuring the SEM results has not been a problem. This is because the oxidation of rare earth metals is normally in the form of easily recognized and fragile white oxide. This oxide is easily pulverized and the powdery oxide can be blown off the film without disturbing the hydride.

To prove the present method, neodymium was evaporated on a glass slide which was coated with a film of 1 percent collodion solution. The film was scribed into squares and stripped with amyl acetate. Electron transmission of the thin film revealed a fine uniform grain substructure as shown in FIG. 1. An electron diffraction pattern was taken of the neodymium film and it indicated interplanar spacing distance for a bcc beta neodymium.

Figure 2:
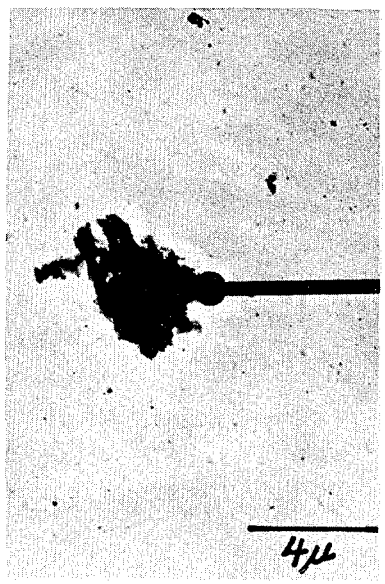
FIG. 2 is an electron diffraction micrograph of an $NdH_2$ reaction site stripped by extraction replica techniques of Nd film reacted in a $H_2$ atmosphere.

In a similar manner the neodymium was then evaporated on glass cover slides which were placed in a glass reaction bottle. The reaction bottle was evacuated, one atmosphere of hydrogen introduced and then the bottle was placed in an oven at 300° F. for one hour. The X-ray diffraction pattern taken from the neodymium-reacted film indicated it to be neodymium dihydride ($NdH_2$). Neodymium lines were not detected. Electron diffraction patterns taken from small reaction nodule sites shown in FIG. 2 also indicated the reaction product to be $NdH_2$.

A 250-grade 18 Ni maraging steel specimen was polished with 600 grit paper and charged with $H_2$ in an electrolytic bath of 5% $H_2SO_4$, saturated both with $CS_2$ and red phosphorus for 7 hours. A film of Nd was deposited on the polished surface of the specimen by placing the specimen under a vacuum and when the vacuum reached $10^{-5}$–$10^{-6}$ mm. Hg, the polished and etched specimen was rotated at 60 r.p.m. One-tenth of a gram of neodymium was evaporated within the vacuum to form a 1400 A. thick beta Nd film on the specimen. Commercially pure Nd was the primary rare earth metal used since, as aforesaid, neodymium of all the rare earth metals seems to form a hydride most quickly and at lower temperatures. A surface interferometer was used to measure the Nd film thickness.

Figure 3:
FIG. 3 is a photomicrograph of $NdH_2$ reaction sites in a Nd film deposited on 250-grade 18 Ni maraging steel magnified 100 times.

The specimen with its film of neodymium was heated to 300° F. for 30 minutes. As shown in FIG. 3, optical microscopic examination of the surface of the specimen revealed black $NdH_2$ reaction sites. X-ray and electron diffraction experiments were then performed to prove that the black reaction sites were neodymium dihydride.

Figure 4:
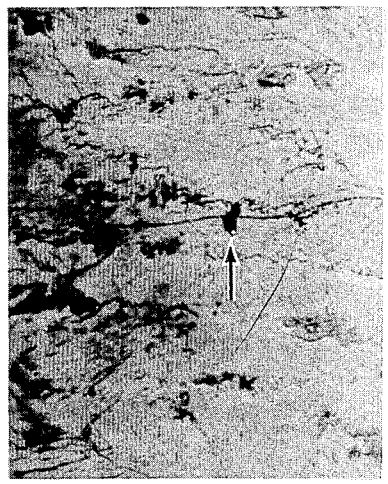
FIG. 4 is a photomicrograph of a $NdH_2$ reaction site magnified 940 times caused by hydrogen emanation from an austenite island in a 250-grade 18 Ni maraging steel weldment.
Figure 5:
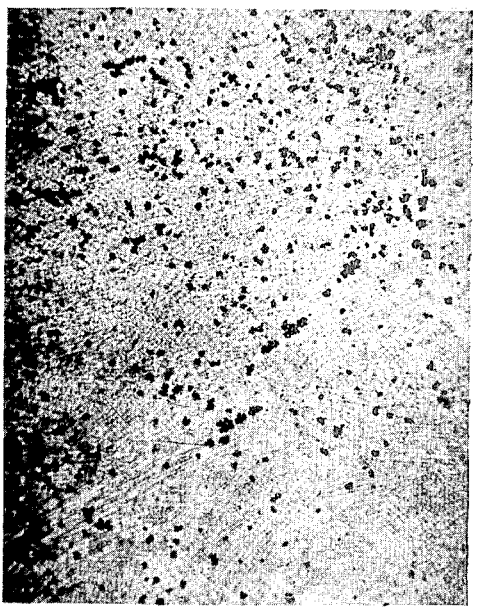
FIG. 5 is a photomicrograph of $NdH_2$ reaction sites magnified 52 times caused by hydrogen emanation and distribution from a 250-grade 18 Ni maraging steel weldment charged with $H_2$.
Figure 6:
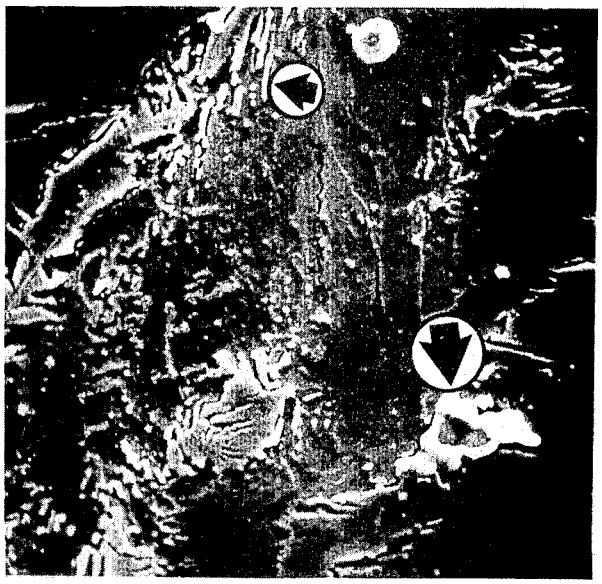
FIG. 6 is a scanning electron micrograph of a 250-grade 18 Ni maraging steel weldment magnified 10,000 times showing individual $NdH_2$ reaction sites caused by hydrogen emanating from austenite islands and along martensite subgrain boundaries.

As a typical application of the present invention, it was used to investigate the hydrogen emanation and distribution of steel. A 250-grade 18 Ni maraging steel weldment uncharged with $H_2$ was polished and etched in Fry's reagent for 8 seconds. A film of neodymium was deposited over the surface and the specimen was heated to 300° F. for one hour in a vacuum. Optical examination as shown in FIG. 4 revealed a low density of black neodymium dihydride reaction sites over the austenite island. This specimen was repolished, etched, and then charged with $H_2$ for 1½ hours. Another film of neodymium was deposited over the surface and the specimen heated at 300° F. for one hour in the evaporator. It was left in the evaporator for 20 hours before removal. Optical examination as shown in FIG. 5 revealed a high density of reaction sites. Examination of the $NdH_2$ sites with a scanning electron microscope as shown in FIG. 6 revealed additional individual neodymium dihydride nodules with better detail. The neodymium dihydride reaction sites in FIG. 6 appear white which is a characteristic of electron charge buildup on the nonconducting hydride. As can be seen, hydrogen emanated from the austenite island and along the martensite subgrain boundaries which align themselves in a preferred orientation.

Figure 7:
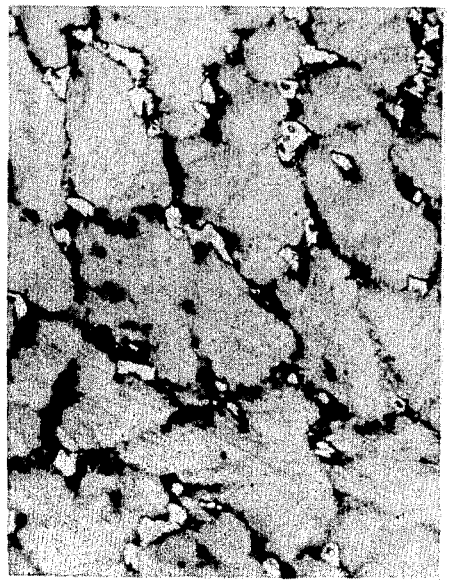
FIG. 7 is a photomicrograph of a 250-grade 18 Ni maraging steel weldment magnified 885 times.

The specimen was then repolished and etched by a two-step etching process which included etching with a hydrofluoric solution (15 ml. HF, 5 ml. $HNO_3$, 400 ml. $CH_3OH$) for 5 seconds followed by an acidified ferric chloride solution (20 gm. $FeCl_3$, 200 ml. HCl, 200 ml. $H_2O$) for 10 seconds. The result is shown in FIG. 7.

Figure 9:
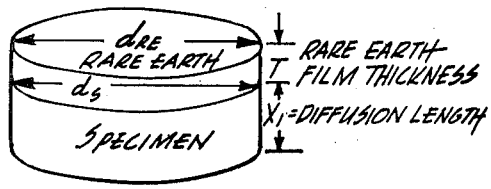
FIG. 9 is a model of a theoretical reaction site.
Figure 8:
FIG. 8 is a photomicrograph of the weldment of FIG. 7 with Nd deposited thereon with arrow indicated $NdH_2$ reaction sites revealing hydrogen emanation from austenite islands and along the preferred orientation direction in martensite.

Neodymium was then deposited on the specimen and the specimen was heated at 300° F. for 1½ hours in a vacuum and then removed. As shown in FIG. 8, the optical resolution of the neodymium dihydride reaction was excellent. The sites are indicated by the arrows. The known size of the reaction sites and the thickness of the rare earth film allows calculation of the bulk hydrogen emission of a specimen in accordance with the model shown in FIG. 9 in the following manner:

$$Xi = \sqrt{Dt}$$

where

D is the hydrogen diffusion coefficient and $t$ is time $$\text{weight of specimen} = W_s = \left(\frac{d_s}{2}\right)^2 \pi Xi$$

where $d_s$ is diameter of specimen $$\text{weight of rare earth hydride} = W_{REH} = \left(\frac{d_{RE}}{2}\right)^2 \pi T$$

where T is film thickness and $d_{RE}$ is diameter of site weight of hydrogen = $W_h$ $$= W_{REH} = \frac{H_2 \text{ molecular weight}}{\text{rare earth molecular weight}}$$

$$\text{parts per million hydrogen} = \frac{W_H}{W_s} \times 10^6$$

Figure 10:
FIG. 10 is a photomicrograph of $NdH_2$ reaction sites at the $\alpha/\beta$ boundaries of titanium alloy Ti–6A1–4V containing 500 p.p.m. hydrogen magnified 975 times.
Figure 11:
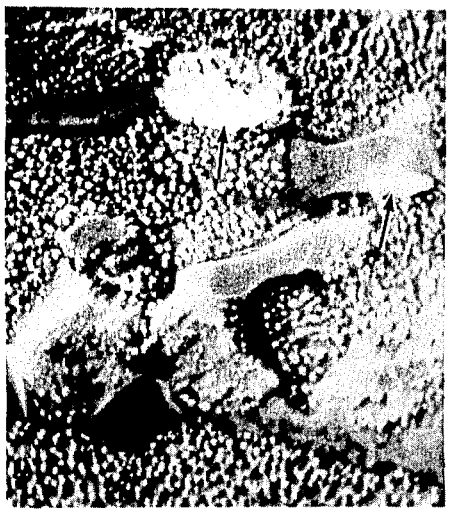
FIG. 11 is a scanning electron micrograph of individual $NdH_2$ reaction sites magnified 10,000 times at $\alpha/\beta$ boundaries in the $\alpha$ matrix and a few sites in the $\beta$ phase of Ti–6A1–4V.

The emanation and distribution of hydrogen in the titanium alloy was also investigated. A transverse section of a ¼ inch tensile specimen of titanium was charged with 500 p.p.m. $H_2$, polished and etched 4 to 5 seconds in Kroll's etchant. A neodymium film was deposited on its surface and the specimen was heated at 300° F. for 1 hour in a vacuum. Optical examination revealed neodymium reaction sites at the $\alpha/\beta$ boundaries (as shown in FIG. 10). A scanning electron microscope examination of this specimen shown in FIG. 11, revealed that at the individual neodymium dihydride reaction sites, hydrogen emanated at the $\alpha/\beta$ interface, alpha matrix, and very little over the beta phase.

Thus there has been shown and described a hydrogen detection method utilizing both optical microscopic and scanning electron microscopic readout methods. The hydrogen emanation from a sample can be observed at its actual emanation sites so that the distribution of the sites along subgrains or boundaries in the sample can be observed and calculations of hydrogen emission of less than .001 part per million are reasonable to expect when a scanning electron microscope is used. For this reason, the present invention is the first method accurate and exact enough to directly measure hydrogen in materials which exhibit hydrogen-stress cracking with hydrogen concentrations of less than 1 p.p.m. Many changes, modifications, alterations and other uses and applications of the subject hydrogen detection method will become apparent to those skilled in the art after considering this specification and the accompanying drawings. All such changes, alterations and modifications which do not depart from the spirit and scope of the invention are deemed to be covered by the invention which is limited only by the claims which follow.

What is claimed is:

1. A method of detecting hydrogen in a specimen including the steps of:
   placing a film of rare earth metal on the specimen;
   allowing the rare earth metal to react with the hydrogen in the specimen; and
   observing rare earth metal hydride sites in the film.
2. The method of claim 1 including the steps of:
   cleaning the specimen;
   placing the specimen in a vacuum; and
   evaporating the rare earth metal on the clean specimen.
3. The method of claim 1 wherein said rare earth metals are chosen from a group consisting of cerium neodymium, praseodymium and yttrium.
4. The method of claim 1 wherein said rare earth metal is reacted with the hydrogen at a temperature between 29° C. and 300° C.
5. The method of claim 1 including the steps of:
   cleaning a metal foil; and
   evaporating a film of rare earth metal onto the foil.
6. The method of claim 1 wherein the step of observing the hydride sites on the film includes:
   magnifying the film with a scanning electron microscope; and
   measuring the size of the hydride sites so that the amount of hydrogen therein can be calculated.
7. The method of claim 1 including the step of:
   selecting a thickness for the rare earth film suitable to the expected hydrogen content of the specimen whereby thinner films are used when less hydrogen is expected.
8. The method of claim 1 wherein said rare earth metal is comprised of neodymium and including the steps of:
   pulverizing any neodymium oxide which may be formed; and
   removing the oxide before observing the hydride sites in the film.
9. The method of claim 1 including the step of:
   retaining the reacted rare earth film on the specimen so that the hydride sites are juxtaposed the areas of the specimen from which the hydrogen emanated.
10. The method of claim 9 wherein the unreacted rare earth film is comprised of neodymium of a thickness which is optically transparent.

References Cited
UNITED STATES PATENTS 3,472,629 10/1969 Rommel et al. _____ 23—254 E
3,567,383 3/1971 Langley et al. _____ 23—254 R MORRIS O. WOLK, Primary Examiner R. M. REESE, Assistant Examiner